Figure 1:
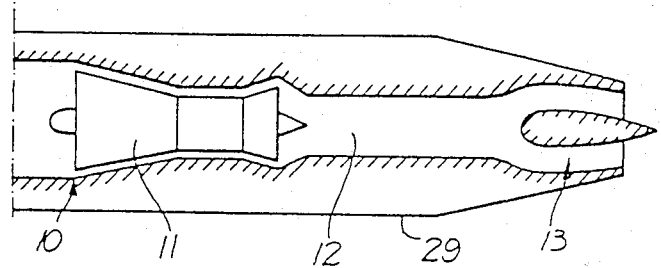

United States Patent [19]

Nightingale

[11] Patent Number: 4,537,026
[45] Date of Patent: Aug. 27, 1985

[54] VARIABLE AREA NOZZLES FOR TURBOMACHINES

[75] Inventor: Douglas J. Nightingale, Atlanta, Ga.
[73] Assignee: Rolls-Royce Inc., New York, N.Y.
[21] Appl. No.: 654,520
[22] Filed: Sep. 25, 1984

Related U.S. Application Data

[63] Continuation of Ser. No. 366,391, Apr. 7, 1982, abandoned.

[51] Int. Cl.³ .......................... F02K 1/08; B64D 33/04
[52] U.S. Cl. ........................................ 60/264; 60/271;
60/39.5; 239/127.3; 239/265.17; 239/265.19
[58] Field of Search ................ 60/264, 39.5, 271, 266,
60/262, 242; 239/265.13, 265.17, 265.19, 127.3;
181/213, 215, 216, 220

[56] References Cited

U.S. PATENT DOCUMENTS

| | | | |
|---|---|---|---|
| 2,938,335 | 5/1960 | Cook, Jr. .......................... | 239/265.13 |
| 3,352,494 | 11/1967 | Colville et al. ................. | 239/265.13 |
| 3,372,876 | 3/1968 | Colville et al. ................. | 239/265.13 |
| 3,780,827 | 12/1973 | Straight ............................ | 60/264 X |
| 3,910,375 | 10/1975 | Hache et al. ..................... | 60/264 |
| 3,970,252 | 7/1976 | Smale et al. ..................... | 60/271 |
| 4,007,587 | 2/1977 | Banthin et al. ................... | 60/39.5 |
| 4,214,441 | 7/1980 | Mouritsen et al. ................ | 60/264 |
| 4,215,537 | 8/1980 | Hurley ............................. | 60/264 |
| 4,295,332 | 10/1981 | Steyer et al. .................... | 60/264 |

Primary Examiner—Carlton R. Croyle
Assistant Examiner—Jeffrey A. Simenauer
Attorney, Agent, or Firm—Cushman, Darby & Cushman

[57] ABSTRACT

Jet propulsion powerplant comprising a gas producer 11 having a first flow duct 12 for receiving the output of the gas producer 11. The flow duct 12 includes a nozzle 13 having a center body 16 which has an upstream part 17 and a downstream part 20. Motors 22 are provided for expanding and contracting the downstream part 20 relative to the upstream part 17. A second flow duct 33 having an inlet 30 openable to airflow and connected to the interior of said upstream part 17 is provided. An outlet 24 from the interior of the upstream part 17, is provided at the downstream end of the upstream part 17. The outlet 24 opens into the interior of the first flow duct 12 by contracting the downstream part 20 relative to the upstream part 17. By such an arrangement, infrared radiation may be suppressed when necessary by opening the inlet for air flow and controlling the upstream and downstream parts so that there can be a mixing of air with exhaust gases which reduces the mean temperature of the exhaust gases.

3 Claims, 4 Drawing Figures

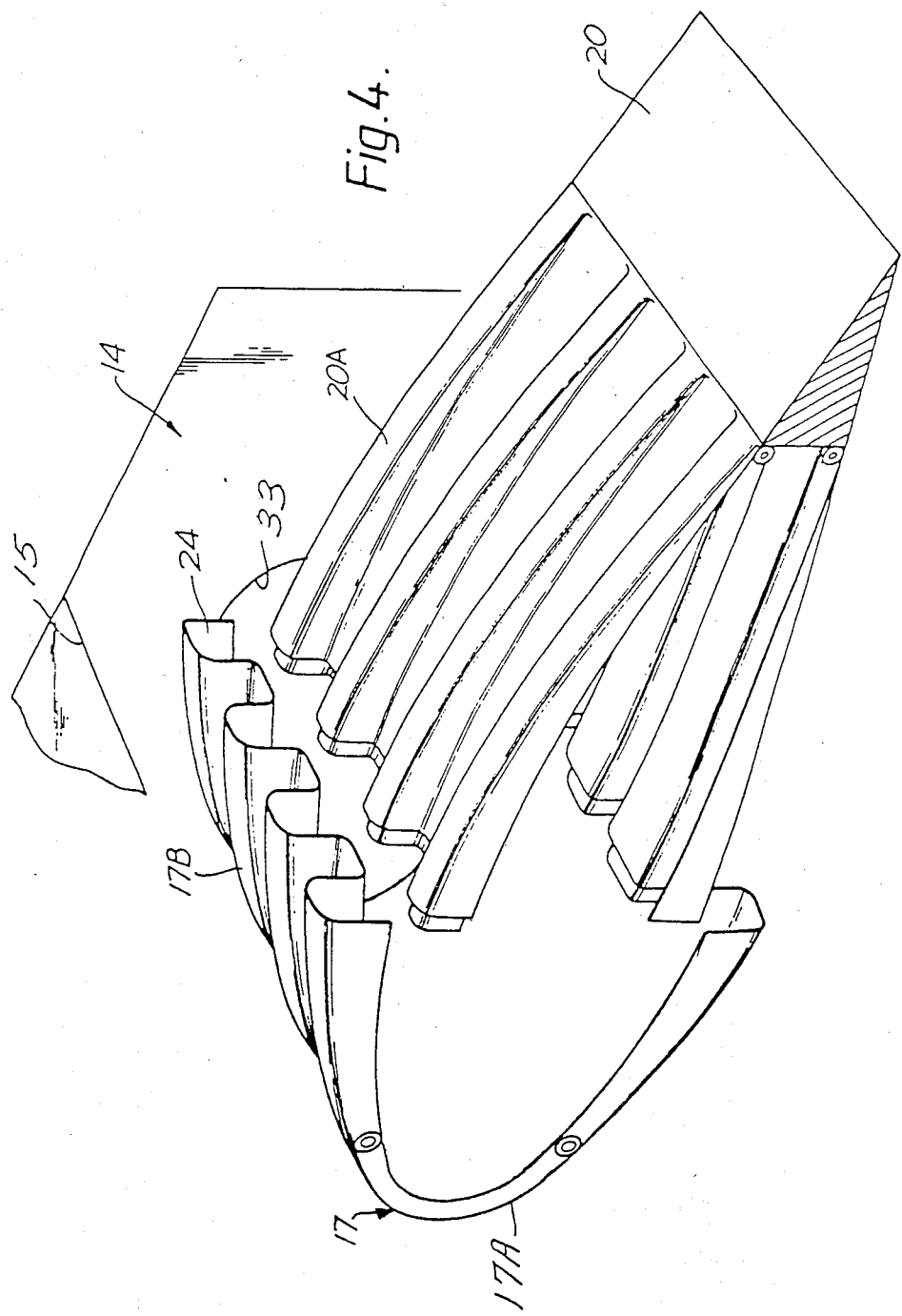

VARIABLE AREA NOZZLES FOR TURBOMACHINES

This is a continuation of application Ser. No. 366,391, filed Apr. 7, 1982, now abandoned.

This invention relates to jet propulsion powerplant and has for its object the suppression of infrared radiation emanating from such powerplant in operation.

According to this invention there is provided a jet propulsion powerplant comprising a gas producer, a first flow duct for receiving the output of the gas producer, the flow duct including a nozzle having a center body, the center body having an upstream part and a downstream part, means for expanding and contracting said downstream part relative to the upstream part, a second flow duct having an inlet openable to airflow and being connected to the interior of said upstream part, an outlet from the interior of the upstream part provided at the downstream end of the upstream part and openable to the interior of the first flow duct by contracting the downstream part relative to the upstream part.

Modern combat aircraft require the flexibility of being able to fly at subsonic or supersonic speeds and to perform a variety of roles. In some roles it is necessary to augment the basic thrust produced by the engine in the "dry" mode by burning additional fuel downstream of the engine's turbines, utilizing the unburnt oxygen in the exhaust gases to support combustion. This mode is known as reheat or afterburning. During reheat it is necessary to increase the area of the nozzle to accommodate the increased volume of gases so as not to impair the efficient functioning of the engine.

In normal operation, i.e. when infrared suppression is not required, both the upstream and downstream parts are expanded or contracted to a position where they align with each other so that they form a substantially smooth transition for flow from the upstream to the downstream part. The upstream and downstream parts may be contracted together in order to increase the area of the nozzle to accommodate the increased volume of gases when the engine is being operated in the reheat mode.

When infrared suppression is required, the downstream part is contracted relative to the upstream part thereby to open said outlet from the interior of the upstream part, and said inlet is opened to establish air flow through the interior of the upstream part and over the contracted downstream part into the first flow duct there to mix with the output of the gas producer. The air being relatively cooler, such mixing reduces the mean temperature of the gas and thereby suppress infrared radiation.

Figure 2:
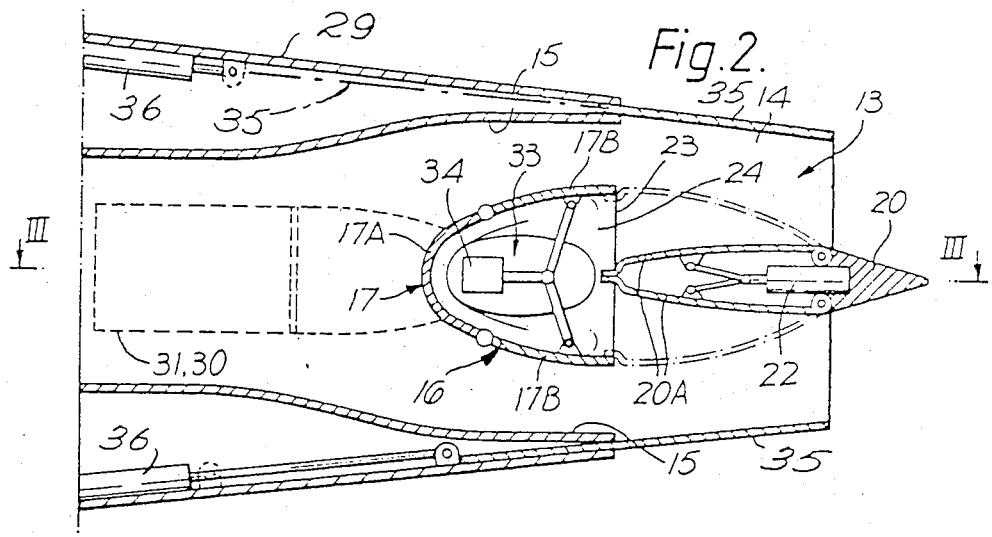
Figure 3:
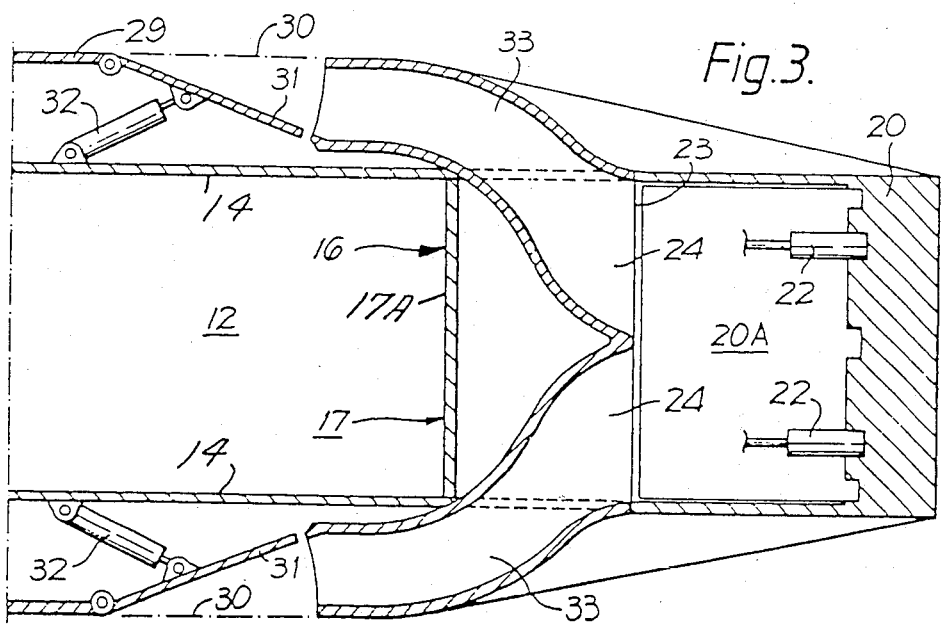

An example of a powerplant according to this invention will now be described with reference to the accompanying drawings wherein:

FIG. 1 is a sectional elevation of the powerplant.
FIG. 2 is an enlarged detail of FIG. 1.
FIG. 3 is a section on the line III—III in FIG. 2, and
FIG. 4 illustrates in more detail part of the nozzle of the powerplant of FIG. 1.

The powerplant, denoted by 10 (FIG. 1) has a gas producer 11 having an output flow duct 12, which is a first flow duct of the powerplant and which terminates in a two-dimensional nozzle 13 defined by two side walls 14, upper and lower walls 15, and a center body 16 connected between the side walls 14.

The body 16 comprises an upstream part 17, constituted by a fixed forward portion 17A and two panels 17B pivotally connected to the fixed portion 17A, and a downstream part 20 made of two panels 20A. The panels 20A bear against the inside surface of the panels 17B and urge them outwards gainst the pressure of the gases flowing through the nozzle.

The panels 20A and 17B are movable by, respectively, motors 22 and 34, between an expanded positon (to define a minimum area throat for the nozzle) and a contracted position (to define a maximum area throat). The panels 20A can be further contracted relative to the panels 17B to such an extent that steps 23 are formed between the downstream end of the panels 17B and the exterior surfaces of the panels 20A. At the steps 23 the interior of the upstream part 17 has outlet openings 24.

The powerplant further has a nacelle 29 including inlet openings 30 having doors 31 openable by motors 32 to admit ambient air into a second flow duct 33 arranged in the side walls 14 at the outside of the first flow duct 12. The duct 33 leads to the interior of the upstream part 17.

In normal operation, i.e. when infrared suppression is not required, the motors 22, 34 are operated to align panels 20A with the panels 17B. The area of the nozzle is defined by expanding or contracting the panels 17B and 20A whilst maintaining them in alignment. In these positions the doors 31 are closed. If infrared suppression is required, the motors 22 are operated to move the panels 20A into the contracted position relative to the panels 17B and the motors 32 are operated to open the doors 31. The ambient air then entering the doors is discharged from the openings 24 and mixes with the gas flow in the duct 12. The relatively cooler air reduces the mean temperature of the flow in the duct 12 and in this way suppresses infrared radiation from the downstream end of the duct 12 and the jet emerging therefrom.

From FIG. 4, where the wall 14 closest to the viewer has been omitted for purposes of clarity, it will be seen that the surface of the panels 17B and 20A are corrugated to improve mixing of the hot gas and cold air streams. The corrugations also impart rigidity to the panels 17B and 20A. The corrugations which begin at the interface between panels 17B and 20A extend respectively upstream and downstream therefrom and then the corrugations fade out at the upstream end and downstream end respectively of the panels 17B and 20A.

The powerplant includes shroud panels 35 normally held in a rectracted position (chain-dotted lines in the upper portion of FIG. 2) between the nacelle 29 and the respective walls 15. If infrared suppression is required the panels are extended relative to the center body 16 by motors 36 into an extended position (full lines as shown in the lower portion of FIG. 2) in which they effectively extend the length of the duct 12 and in which they reduce infrared visibility both by physically shielding the hot gases from view and by promoting mixing with the air from the duct 33. These shroud panels 35 may also be extended when the nozzle is in the reheat mode to define a divergent flow path downstream of the throat of the nozzle for improved supersonic performance.

I claim:
1. A jet propulsion powerplant comprising:
a gas producer;

a first flow duct for efflux of said gas producer, said first flow duct including a nozzle at the downstream end thereof;

a center body positioned within said nozzle and having an interior chamber, said center body including an upstream part and a downstream part, said upstream part including a fixed forward portion and an expandable and contractible downstream portion, said downstream part having an expandable and contractible upstream portion selectively operable to coact and move with said downstream portion of said upstream part to vary the cross-sectional area of said nozzle of said first flow duct and to contract and move relative to said downstream portion of said upstream part to provide communication between said chamber and said first flow duct;

means for expanding and contracting said downstream portion of said upstream part and said upstream portion of said downstream part, said means including a first means operatively connected to said downstream portion of said upstream part for expanding and contracting the same and a second means operatively connected to the said upstream portion of said downstream part for expanding and contracting the same, said first means and said second means being capable of simultaneous operation to simultaneously expand and contract said downstream portion of said upstream part and said upstream portion of said downstream part, said second means being capable of operation independently of said first means to contract said upstream part of said downstream portion relative to said downstream portion of said upstream part to provide the communication between said chamber and said first flow duct;

a second flow duct having an inlet for air flow and an outlet opening into said chamber of said center body;

and means to open and close said second flow duct, said last mentioned means including a door operatively closing said second flow duct and a motor operatively connected to said door, said motor being operable to open said door of said second flow duct for air flow therethrough when said upstream portion of said downstream part has been contracted relative to said downstream portion by said second means.

2. Powerplant according to claim 1, comprising a wall defining at least a part of said first duct, said fixed forward portion of said upstream part of said center body being connected to said wall, said second flow duct being arranged adjacent said wall and being connected to said chamber of said center body through said wall.

3. Powerplant according to claim 1 comprising a wall defining at least a part of said first duct, shroud means supported at said wall and movable between a retracted and an extended position thereby to vary the length of said first duct relative to said center body and means operatively connected to said shroud means to move said shroud means between said retracted position and said extended position.

* * * * *